(12) United States Patent
Moore

(10) Patent No.: US 8,717,208 B2
(45) Date of Patent: May 6, 2014

(54) IMAGE PROCESSING

(75) Inventor: John Kevin Moore, Edinburgh (GB)

(73) Assignee: STMicroelectronics (Research & Development) Limited, Marlow, Buckinghamshire (GB)

( * ) Notice: Subject to any disclaimer, the term of this patent is extended or adjusted under 35 U.S.C. 154(b) by 238 days.

(21) Appl. No.: 12/956,929

(22) Filed: Nov. 30, 2010

(65) Prior Publication Data

US 2011/0135218 A1    Jun. 9, 2011

(30) Foreign Application Priority Data

Dec. 3, 2009  (GB) .................................. 0921212.7

(51) Int. Cl.
*H03M 1/48* (2006.01)
*H03M 1/10* (2006.01)
*H03M 1/20* (2006.01)

(52) U.S. Cl.
USPC ............ 341/115; 341/120; 341/121; 341/131

(58) Field of Classification Search
None
See application file for complete search history.

(56) References Cited

U.S. PATENT DOCUMENTS

| | | | | |
|---|---|---|---|---|
| 5,848,123 A * | 12/1998 | Strommer | ..................... | 378/98.8 |
| 6,707,492 B1 * | 3/2004 | Itani | ........................... | 348/229.1 |
| 7,043,089 B2 * | 5/2006 | Ballard | .......................... | 382/237 |
| 7,301,999 B2 * | 11/2007 | Filippini et al. | ......... | 375/240.03 |
| 7,369,276 B2 * | 5/2008 | Couwenhoven et al. | .... | 358/3.03 |
| 7,710,474 B2 * | 5/2010 | Hatano | .......................... | 348/252 |
| 8,098,953 B2 * | 1/2012 | Watanabe et al. | ............. | 382/274 |
| 8,294,781 B2 * | 10/2012 | Cote et al. | ................... | 348/222.1 |
| 2002/0089701 A1 * | 7/2002 | Lu et al. | ......................... | 358/443 |
| 2004/0174441 A1 * | 9/2004 | Castorina et al. | .......... | 348/223.1 |
| 2005/0099505 A1 * | 5/2005 | Suzuki | ......................... | 348/222.1 |
| 2005/0117805 A1 * | 6/2005 | Poutet et al. | ................... | 382/232 |
| 2005/0140795 A1 * | 6/2005 | Hisamatsu et al. | ......... | 348/222.1 |
| 2006/0038826 A1 * | 2/2006 | Daly | .............................. | 345/598 |
| 2007/0052813 A1 * | 3/2007 | Neter | .......................... | 348/222.1 |
| 2007/0132617 A1 * | 6/2007 | Le | ................................... | 341/120 |
| 2007/0279432 A1 * | 12/2007 | Noel et al. | ...................... | 345/596 |
| 2009/0284546 A1 * | 11/2009 | Brown Elliott | ............... | 345/596 |
| 2010/0007760 A1 * | 1/2010 | Suzuki et al. | ............... | 348/222.1 |
| 2010/0085438 A1 * | 4/2010 | Richardson | ................ | 348/222.1 |
| 2011/0019025 A1 * | 1/2011 | Koseki | ......................... | 348/222.1 |
| 2011/0019047 A1 * | 1/2011 | Suzuki et al. | ................. | 348/302 |

FOREIGN PATENT DOCUMENTS

EP  1628470 A2  2/2006
JP  2000-013693 A  1/2000

OTHER PUBLICATIONS

International Search Report, mailed Feb. 11, 2010, for GB0921212.7 (3 pages).
English Abstract of JP2000-013693 (2 pages).
Machine Translation of JP 2000-013693 (10 pages).

* cited by examiner

*Primary Examiner* — Avinash J Yentrapati
(74) *Attorney, Agent, or Firm* — Gardere Wynne Sewell LLP

(57) ABSTRACT

An image processor includes a readout arranged to read out an M-bit image data word from an image sensor pixel array and an adder arranged to add a noise contribution to the image data word to obtain a dithered M-bit word. A dither processor is arranged to derive correction data having a word size of M+1 bits from a combination of a plurality of M-bit reference words. The noise contribution are derived from said correction data, wherein different correction data are derived for different groups of pixels, each different group of pixels is associated with a specific pixel value DC shift.

27 Claims, 6 Drawing Sheets

IMAGE PROCESSING

PRIORITY CLAIM

This application claims priority from Great Britain Patent Application No. 0921212.7 filed Dec. 3, 2009, the disclosure of which is hereby incorporated by reference.

TECHNICAL FIELD

The present invention relates to improvements in or relating to image processing, and in particular to the dithering of the output from a pixel array of an image sensor.

BACKGROUND

An image sensor is a device comprising one or more radiation sensitive elements having an electrical property that changes when radiation is incident upon them, together with circuitry for converting the changed electrical property into a signal. As an example, an image sensor may comprise a photodetector that generates a charge when radiation is incident upon it. The photodetector may be designed to be sensitive to electromagnetic radiation in the range of (human) visible wavelengths, or other neighboring wavelength ranges, such as infra red or ultra violet for example. Circuitry is provided that collects and carries the charge from the radiation sensitive element for conversion to a value representing the intensity of incident radiation.

Typically, more than one radiation sensitive element will be provided in an array. The term pixel is used as a short hand for picture element. In the context of a digital image sensor, a pixel refers to that portion of the image sensor that contributes one value representative of the radiation intensity at that point on the array. These pixel values are combined to reproduce a scene that is to be imaged by the sensor. The set of pixel values is usually referred to as image data. Pixels are usually formed on and/or within a semiconductor substrate. In fact, the radiation sensitive element comprises only a part of the pixel. Other parts of the pixel are taken up by metallization such as transistor gates and so on. Other image sensor components, such as readout electronics, analog to digital conversion circuitry and so on may be provided at least partially as part of each pixel, depending on the pixel architecture.

In electrical systems, any digital representation of an analog signal will necessarily introduce some element of quantization error as the accuracy of the digital representation of an analog signal is limited by the resolution (word size) of the converter used to represent the values. An example of this is illustrated in FIG. 1 where an analog signal 10 is shown comprising a voltage (on the y-axis) that varies with time (on the x-axis). In this example the digital representation obtained by a three bit analog to digital converter (ADC) is shown as reference 12. The use of a three bit ADC means that the digital representation of the signal 12 can only take one of eight possible values ($8=2^3$). The possible values for the digital representation are illustrated by the dotted lines in the Figure. The difference in voltage between the actual analog signal and the digital representation is known as the quantization error. The quantization error becomes less when a higher resolution ADC is used. However, higher resolution ADCs use up more memory and are slower and more expensive.

A "digital ramp ADC" functions by comparing a ramped voltage with the signal that is being sampled. This type of ADC is commonly used in solid state image sensors such as CCD and CMOS image sensors, and is illustrated in FIG. 2. A comparator 20 is provided (which may for example be an operational amplifier) and is set up to receive a voltage (Vpix) to be sampled at one input (in this example the non-inverting input) and a signal from a digital to analog convertor (DAC) 22 at its other input (in this example the inverting input). The DAC 22 is driven by a ramped voltage. This is driven upwards in increments at time periods set by a counter 24. At a time of sampling, the counter is started and the ramp increased, typically in a linear manner. When the value of the ramp matches the value of the input voltage to be sampled, this causes the comparator 20 to change state (switching from low to high or high to low depending upon the particular set-up). A memory 26 reads the output from the comparator 20 and from the DAC 22, and when the output from the comparator changes state, the memory 26 stores the digital code output from the counter 24. The memory 26 may for example comprise a SRAM element. Again, the accuracy of the representation of the data depends upon the resolution of the ADC, which is governed by the resolution of the digital ramp.

"Dithering" is a technique applied to digital data in order to compensate for noise caused by quantization errors. The technique works by intentionally applying an additional noise component to the digital data values, with the type of noise applied being chosen to randomize quantization errors. The process can also be known as error diffusion.

Using conventional techniques, one cannot add or subtract less than one code to compensate for row or column noise in an image. The effectiveness of compensation is limited by quantization noise. This can be improved using an ADC with the higher accuracy. However, this is a costly solution and has knock-on effects in other areas of image sensor design and is therefore undesirable.

SUMMARY

According to a first aspect there is provided a method of image processing comprising: reading out an M-bit image data word from an image sensor pixel array and adding a noise contribution to said image data word to obtain a dithered M-bit word; wherein said noise contribution is derived from correction data that has a word size of at least N bits (where $N \geq 1$) and is derived from a combination of a plurality of M-bit reference words, and wherein different correction data are derived for different groups of pixels, each different group of pixels is associated with a specific pixel value DC shift.

Optionally, the combination of a plurality of M-bit reference words comprises the average of the reference words.

Optionally, the plurality of reference words are taken from different rows or other areas of a pixel array.

Optionally, the plurality of reference words comprise at least two reference words taken from the same row or other area of a pixel array at different times.

Optionally, the reference words are derived from a plurality of dark pixel values.

Optionally, each of said different groups of pixels is defined by those pixels that share a common readout block in a column ADC structure.

Optionally, each of said different groups of pixels is defined by those pixels that share a common readout time.

Optionally, each of said different groups of pixels is defined by those pixels that share a common row of an image sensor array.

Optionally, the step of deriving said noise contribution from said correction data comprises combining the M most significant bits of the correction data with a weighted dither contribution derived from the N−M least significant bits of the correction data.

According to a second aspect there is provided an image processor comprising: a readout arranged to read out an M-bit image data word from an image sensor pixel array; an adder arranged to add a noise contribution to said image data word to obtain a dithered M-bit word; and a dither processor arranged to derive correction data having a word size of M+1 bits from a combination of a plurality of M-bit reference words; said noise contribution being derived from said correction data, and wherein different correction data are derived for different groups of pixels, each different group of pixels is associated with a specific pixel value DC shift.

Optionally, said dither processor is arranged to calculate the average of the plurality of M-bit reference words, said average forming said correction data.

Optionally, the plurality of reference words are taken from different rows or other areas of a pixel array.

Optionally, the plurality of reference words comprise at least two reference words taken from the same row or other area of a pixel array at different times.

Optionally, the reference words are derived from a plurality of dark pixel values.

Optionally, each of said different groups of pixels is defined by those pixels that share a common readout block in a column ADC structure.

Optionally, each of said different groups of pixels is defined by those pixels that share a common readout time.

Optionally, each of said different groups of pixels is defined by those pixels that share a common row of an image sensor array.

Optionally, said dither processor is arranged for combining the M most significant bits of the correction data with a weighted dither contribution derived from the N–M least significant bits of the correction data.

Optionally, said image processor comprises a multiplexer addressed by the N–M least significant bits of the correction data and circuitry that defines weightings for the addressable multiplexer values.

According to a third aspect there is provided a digital image sensor comprising an image processor comprising: a readout arranged to read out an M-bit image data word from an image sensor pixel array; an adder arranged to add a noise contribution to said image data word to obtain a dithered M-bit word; and a dither processor arranged to derive correction data having a word size of M+1 bits from a combination of a plurality of M-bit reference words; said noise contribution being derived from said correction data and wherein different correction data are derived for different groups of pixels, each different group of pixels is associated with a specific pixel value DC shift.

Further aspects provide a mobile telephone, optical mouse or webcam comprising the digital image sensor of the third aspect.

BRIEF DESCRIPTION OF THE DRAWINGS

The present invention will now be described, by way of example only, with reference to the accompanying drawings in which.

DETAILED DESCRIPTION OF THE DRAWINGS

Figure 1:
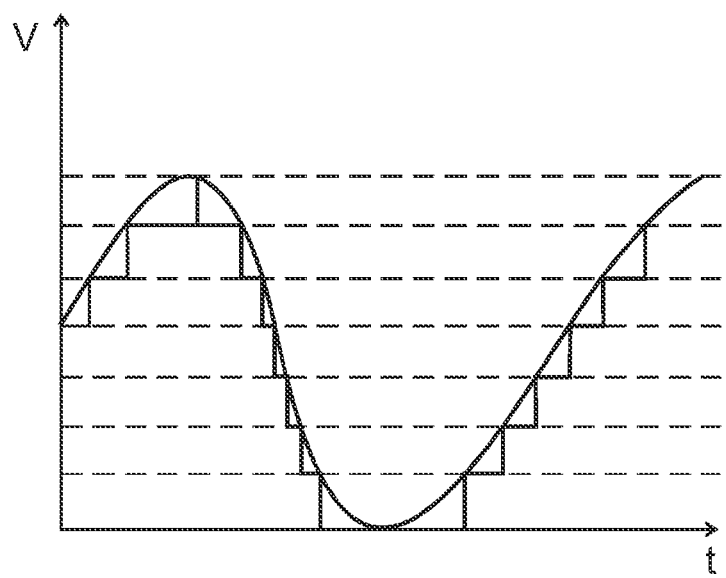
FIG. 1 illustrates quantization noise in the digital representation of an analog signal.
Figure 2:
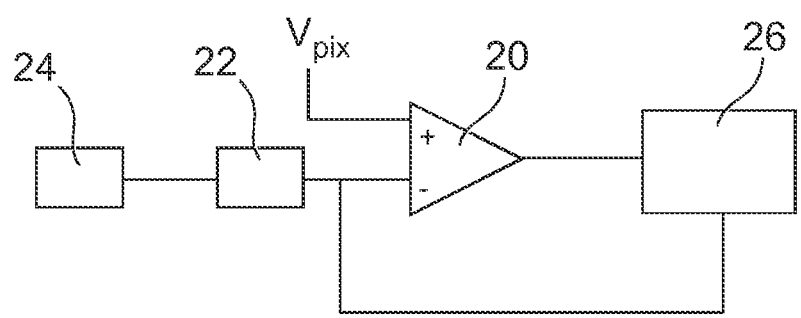
FIG. 2 illustrates a ramped ADC of the type used in a digital image sensor.
Figure 3:
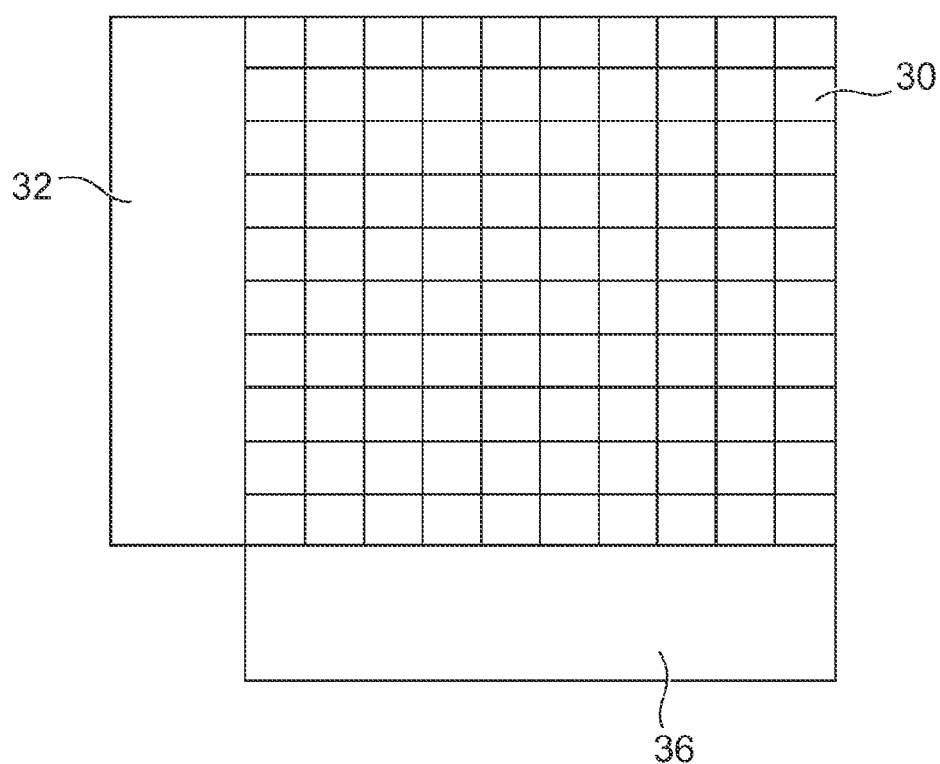
FIG. 3 illustrates aspects of an image sensor architecture.

Image sensors normally include an array of pixels arranged in rows and columns. An image is read out, row by row, via an array of ADCs. Every pixel in a column of data is read out by the same ADC. An example of this is shown in FIG. 3. A pixel array 30 comprises pixels arranged in rows and columns. Row select circuitry 32 is provided that controls the selection of rows for reset and readout operations. Column readout circuitry 36 is provided, which comprises a dedicated ADC for every pixel in each row. To read out a row, the charge in every pixel is simultaneously transferred to give a voltage on the Floating Diffusion Node (FDN). This voltage is then buffered by a source follower, so an output voltage can be converted by column ADC's.

Figure 4:
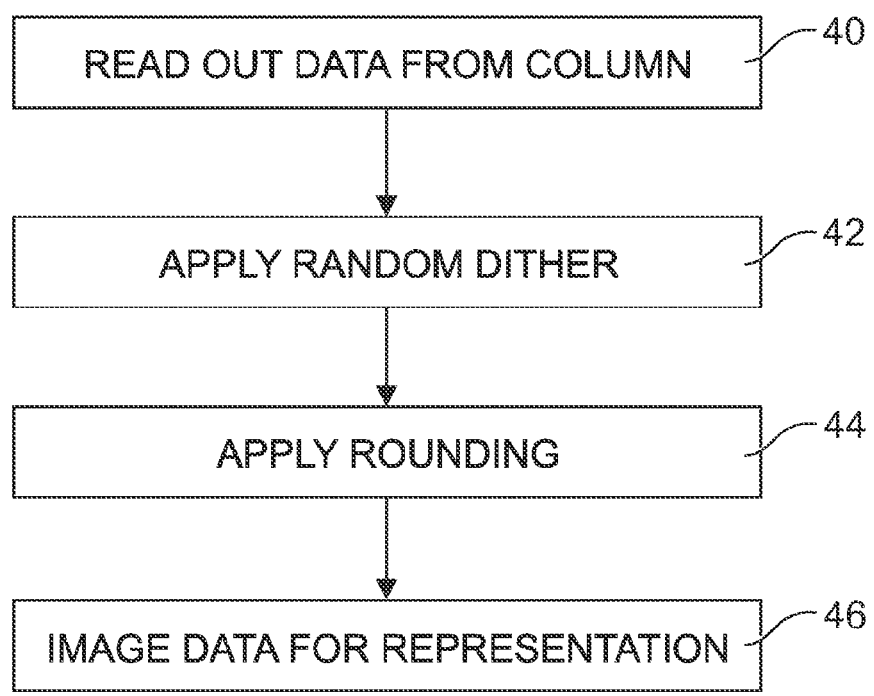
FIG. 4 illustrates the application of a random dither.

FIG. 4 illustrates a prior art image readout process. The data is read out from the column (step 40) and then a random dither is applied (step 42). The result is then rounded (step 44). This rounded result then becomes the resultant image data for use in subsequent image processing steps for representation of the image (step 46).

Dithering can be applied to either a monochrome or a color image. The basic principle takes advantage of the human eye's tendency to average or smooth out pixel values in close proximity. For example, instead of rounding a value of "2.48" to 2 every time, the application of a dither as described above means that this is rounded sometimes to 3 and sometimes to 2. For example, say a dither of between −0.1 and 0.1 was added: this would mean that 2.48 could become 2.58, and would round to 3; other times 2.48 would become 2.38, and would round to 2. The more detail in the original image, the finer the dither: if a dither of 0.01 was added in this case then we would have 2.49, which would still be rounded to 2. This means, when a large number of pixels are averaged by eye, we have a value closer to 2.48. This can reduce quantization artifacts by smoothing out the effects of transitions, for example if an edge drifts from 2.48 to 2.51 over a distance the application of dithering avoids there being a sharp transition (from 2 to 3) along a line, instead, smoothing the transition over a larger area, effectively introducing a halftone effect to the image to smooth out the variations as viewed by a human eye. It is worth noting that this example uses a decimal example of dither, but the same technique could easily be applied to a binary format.

Typically a random dither is applied to every pixel before a rounding operation takes place. However, this relies initially upon having additional information and thus more quantization levels for each pixel. For example, if pixels from an existing image were to 10 bit accuracy and there was a requirement for an 8 bit image to be output, dithering would help to make quantization errors less apparent to the eye by adopting the methodology described above. The dither likelihood, applied to every pixel prior to rounding, is then identical. If existing data is 8 bit, and the required output data is also 8 bit, then this technique is clearly not viable.

In contrast to this technique the present disclosure applies a statistically weighted pseudo-random dither to a set of pixel data, the weightings of which are chosen to take account of a common factor of the image sensor design. This is possible because a group of pixels to which this common factor applies will have a common DC shift.

Figure 5:
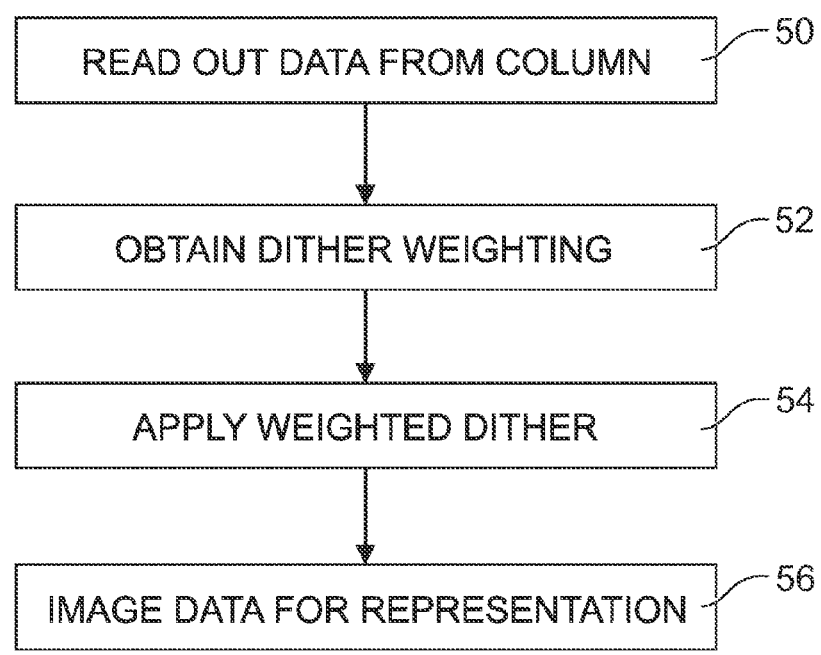
FIG. 5 illustrates the application of a weighted dither.

This process is illustrated in FIG. 5. The data is read out from the column (step 50) and then a dither weighting is obtained (step 52). The dither weighting can in one embodiment be provided in the form of kernel coefficients for a digital filter, in a special case where a single-stage digital filter is provided per column. The weighted dither is then applied (step 54). The result then becomes the resultant image data for use in subsequent image processing steps for representation of the image (step 56).

Figure 6:
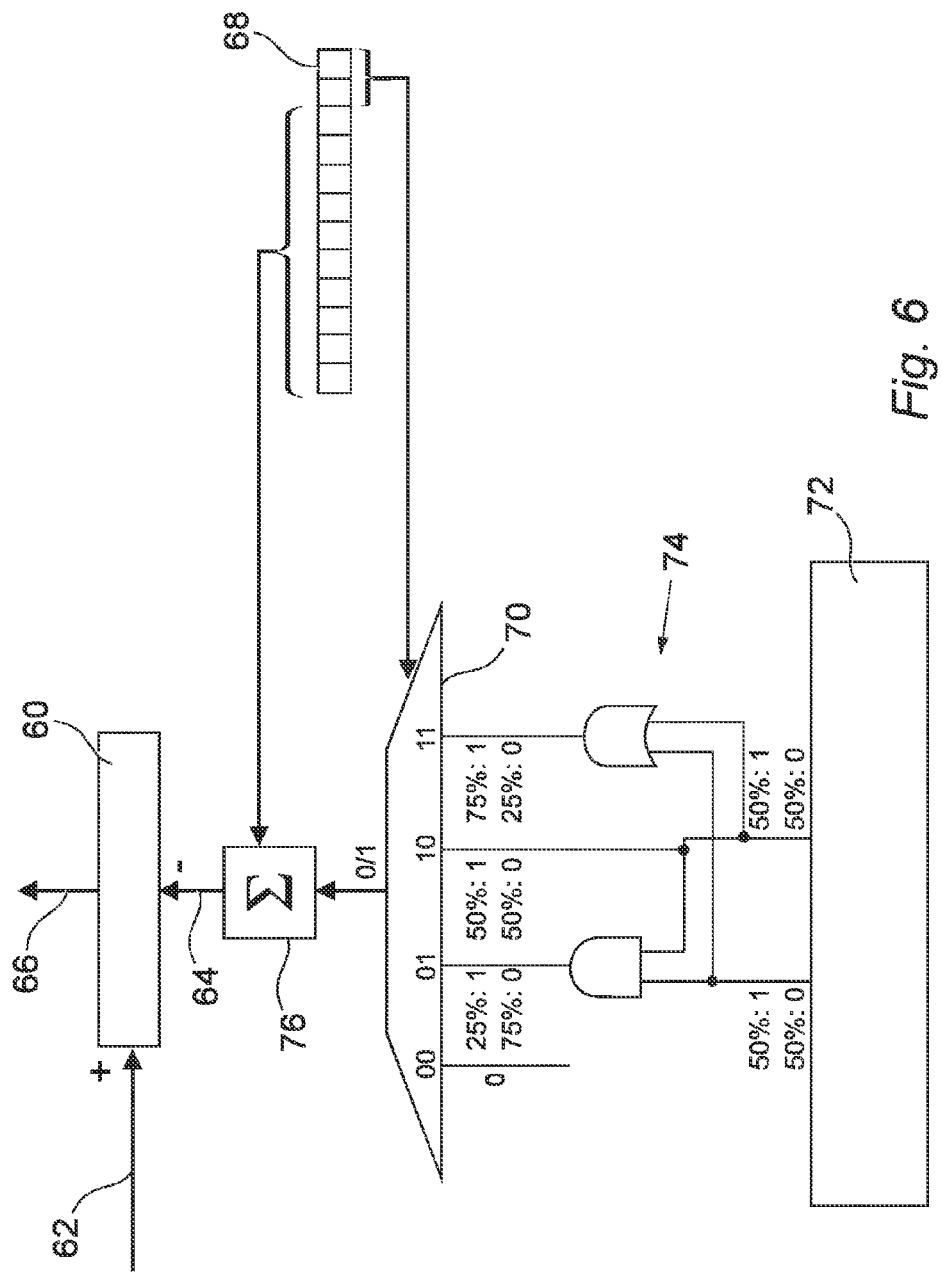
FIG. 6 illustrates an example dither architecture.

There are many different implementation examples for a dither, and without limiting the scope of the scope of the disclosure and for the purposes of illustration, FIG. 6 shows an example implementation, in which a dither is applied to data generated from the readout of optically shielded pixels. The use of optically shielded pixels allows the generation of correction data independent of radiation incident on the sensor. In the embodiment of FIG. 6, the correction value that is used for correction has a weighted dither applied.

Data 62 from a column ADC of an image sensor is combined by an application 60 with dithered correction data 64 to provide an output 66 that forms the "image data" i.e. pixel value used in the representation of the image. The dithered correction data 64 represents a "dark value" that is subtracted from the collected data 62.

The source correction data 68 is of an X-bit size, in this example X=12. The Y least significant bits (LSB's) of the source data 68 are used as the address of a multiplexer (MUX) 70. In this example Y=2 and this two bit address is used to latch the MUX output to one of four values defined at its inputs. The MUX inputs are weighted to have different probabilities of being a one or a zero. In this example the weightings are defined by a pseudo-random number generator 72 and logic circuitry 74 so that, if the two LSB's of the correction data 68 are 00, a zero will be output by the MUX 70; if the two LSB's of the correction data 68 are 01, the MUX will output a 1 with a 25% probability or a 0 with a 75% probability; if the two LSB's of the correction data 68 are 10, the MUX will output a 1 with a 50% probability or a 0 with a 50% probability; if the two LSB's of the correction data 68 are 11, the MUX will output a 1 with a 75% probability or a 0 with a 25% probability.

The pseudo-random number generator 72 in this example is provided with two independent outputs, each outputting a 1 or a 0 with 50% probability respectively. There are many well known circuits that can serve as pseudo-random number generators, and any of these can be used. The logic circuitry 74 in this example comprises an AND and an OR gate connected as shown that provide the weightings for the MUX inputs as illustrated and as described above. It will be appreciated that alternative circuitry could be provided in order to provide different weightings, and also that alternative circuitry could be provided to process different numbers of correction data LSB's and MUX inputs. For example, three LSB's of correction data could be used to address one of eight MUX inputs, with additional logic gates and/or pseudo-random generator outputs provided to define any choice of weightings to be applied.

The latched output of the MUX 70 then provides a one-bit weighted dither contribution. This is summed with the M–N MSB's of correction data 68 by summation block 76 to account for the fractional part of the correction that is to be applied, providing the dithered correction data 64 that is combined with the column ADC data 62 as mentioned above.

The correction data 68 used for the dithering is specific to an individual column ADC that is being read out. Different correction data 68 can be used for different columns. In this way, pixels that share common design factors of the image sensor can be grouped together and differences between groups of pixels sharing different design factors can be compensated for.

In one embodiment, the correction data is derived from averaged "dark pixel" values obtained from pixels which are held in reset or from inactive pixels that are permanently shielded from incident radiation.

It is also possible to average dark pixel values to reduce individual pixel noise contribution and then subtract this value from the group of pixels by applying a dither (the average could be the average of dark pixel values from different rows, or of dark pixel values of one or more rows taken at different time intervals). In this way, an average value can be subtracted which is less than one code.

The very act of correction adds to the fixed pattern noise from the temporal noise of a sampled pixel. This effect is however mitigated by collecting multiple samples. It has been shown that if a number of samples greater than the square of the ratio of the standard deviations of the pixel noise and column fixed pattern noise are collected, the contribution from the added FPN becomes less significant than the FPN cancelled.

There are many design factors that can be accounted for by the methods and apparatus of this disclosure. For each common design factor there will be a DC shift associated with a group of pixels.

For example, as a result of process mismatch, the pixel data read out from a single column may have an associated offset with respect to its neighbors. Since this fixed offset will be apparent in every pixel read out by that ADC, i.e. a column of data, the resulting image artifact is commonly known as Vertical Fixed Pattern Noise (VFPN) or Fixed Pattern Noise (FPN).

In order to optimize the layout of these components in terms of area and current consumption column current sources and comparator biasing networks are usually laid out in repeating blocks across multiple columns. Laying out the device in this manner is efficient, but it also opens up possibilities for periodic offset patterns in ADC output code values. The periodicity of such repeated noise pattern depends on the size of the common block readout and therefore can vary from one image sensor to the other. This may be due to parasitic capacitances or resistances, or physical effects of column to column differences on transistor parameters. Periodic column offsets are very visible to the eye, and will be known as Repeating Pattern Vertical Fixed Pattern Noise (Repeating VFPN).

The outputs from pixels in an array are affected by noise from various different sources such as photon shot noise, thermal noise, and Random Telegraphic Signal (RTS) noise for example. These are in addition to the quantization noise inherent in the ADC as discussed above.

The human eye is however sensitive to repeating patterns of noise and in particular to patterns that are common to a given line or block of lines within an image sensor, which result in undesirable banding or stripes in an image.

This problem can be corrected for by the application of a weighted dither with correction data that is different for each block of column readouts. The correction data can represent an offset from an ideal value that is specific to each column.

The use of the intelligent weighted dither allows cancellation of row and/or column fixed pattern noise below quantization noise levels. This reduction of row and/or column fixed pattern noise is achieved at the expense of increasing individual pixel noise. This is however acceptable because the noise in rows or columns is very obvious to the human eye and is in fact masked by the pixel noise. Standard FPN reduction can only add or subtract integers to or from rows and columns, whereas an implementation with a weighted dither block can add or subtract smaller values to or from columns.

As well as or instead of being from the same column readout block, the group of pixels that share the same design factor could be a row or other group that is read out at a specific time in a readout process. That specific time could for example be associated with some irregularity in the supply voltage that causes a certain DC shift.

As another example, the group of pixels that share the same design factor could be groups of pixels that are affected by other factors such as lens shading. A group of shaded pixels will have a DC shift that is different from unshaded pixels, or shading effects that arise from pixel metallization layers that vary across the array can be compensated for.

According to the present disclosure an image can be produced that has an acceptable appearance to a user without having to incorporate expensive additional higher resolution ADC circuitry.

Figure 7:
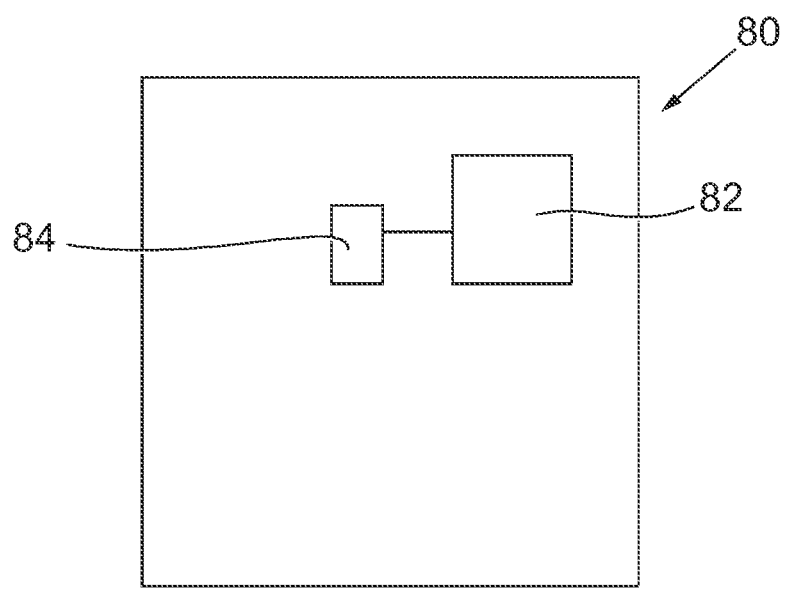
FIG. 7 shows a device incorporating an image sensor with an improved dither according to the various embodiments described herein.

The contents of the disclosure can be incorporated within a wide range of devices. FIG. 7 shows a device 80 comprising an image sensor 82 and an intelligent dither block 84 for performing the methods mentioned herein. The device can be for example, a mobile device such as a cellular telephone, personal digital assistant or it could be for example a webcam, an optical mouse, a laptop, a barcode reader or another such device. The person skilled in the art will know how to incorporate an image sensor according to this invention into any of these devices without the need for specific teaching using his knowledge.

Various improvements and modifications can be to the above without departing from the scope of the invention.

What is claimed is:

1. A method of image processing of data output from an image sensor pixel array including a plurality of columns, wherein pixels in a column are associated with a specific pixel value DC shift, comprising
   assigning to each column of pixels a correction data accounting for the specific pixel value DC shift;
   reading out an image data word from a pixel located in a column within the image sensor pixel array;
   selecting one of a plurality of weighted dither data values in response to one or more bits of the correction data assigned to the column where the pixel is located; and
   adding the selected weighted dither data value to said image data word to obtain a dithered image data word.

2. The method of claim 1, further comprising deriving said correction data from a combination of a plurality of reference words, wherein the combination of a plurality of reference words comprises the average of the reference words.

3. The method of claim 1, further comprising deriving said correction data from a combination of a plurality of reference words, wherein the plurality of reference words are taken from different rows or other areas of a pixel array.

4. The method of claim 1 further comprising deriving said correction data from a combination of a plurality of reference words, wherein the plurality of reference words comprise at least two reference words taken from the same row or other area of a pixel array at different times.

5. The method of claim 1, further comprising deriving said correction data from a combination of a plurality of reference words, wherein the reference words are derived from a plurality of dark pixel values.

6. The method of claim 1, further comprising assigning correction data to different groups of pixels, wherein each of said different groups of pixels is defined by those pixels that share a common readout block in a column ADC structure.

7. The method of claim 1, further comprising assigning correction data to different groups of pixels, wherein each of said different groups of pixels is defined by those pixels that share a common readout time.

8. The method of claim 1, further comprising assigning correction data to different groups of pixels, wherein each of said different groups of pixels is defined by those pixels that share a common row of an image sensor array.

9. The method of claim 1, wherein selecting said weighted dither data value comprises combining a plurality of more significant bits of the correction data with at least one weighted dither bit selected by one or more less significant bits of the correction data.

10. An image processor for processing data output from an image sensor pixel array including a plurality of columns, wherein pixels in a column are associated with a specific pixel value DC shift, comprising:
    for each column of pixels an assigned correction data accounting for the specific pixel value DC shift;
    a readout circuit configured to read out an image data word from a pixel located in a column within the image sensor pixel array;
    an adder circuit configured to add a selected weighted dither data value to said image data word to obtain a dithered image data word; and
    a dither processor configured to select one of a plurality of weighted dither data values as the selected weighted dither data value in response to one or more bits of the correction data assigned to the column where the pixel is located.

11. The image processor of claim 10, wherein said correction data is calculated from an average of a plurality of reference words.

12. The image processor of claim 11, wherein the plurality of reference words are taken from different rows or other areas of a pixel array.

13. The image processor of claim 11, wherein the plurality of reference words comprise at least two reference words taken from the same row or other area of a pixel array at different times.

14. The image processor of claim 11, wherein the plurality of reference words are derived from a plurality of dark pixel values.

15. The image processor of claim 10, further comprising assigning correction data to different groups of pixels, wherein each of said different groups of pixels is defined by those pixels that share a common readout block in a column ADC structure.

16. The image processor of claim 10, further comprising assigning correction data to different groups of pixels, wherein each of said different groups of pixels is defined by those pixels that share a common readout time.

17. The image processor of claim 10, further comprising assigning correction data to different groups of pixels, wherein each of said different groups of pixels is defined by those pixels that share a common row of an image sensor array.

18. The image processor of claim 10, wherein said dither processor is further configured to combine a plurality of more significant bits of the correction data with at least one weighted dither bit selected by one or more less significant bits of the correction data.

19. The image processor of claim 18, comprising a multiplexer addressed by the less significant bits of the correction data to select the weighted dither bit and circuitry that defines weightings for the addressable multiplexer values.

20. The image processor of claim 10, wherein the image processor is selected from the group consisting of a mobile telephone, an optical mouse and a webcam.

21. An apparatus, comprising:
an image sensor pixel array including a plurality of pixels arranged in rows and columns, wherein pixels in each column are associated with a specific pixel value DC shift and each column of pixels having an assigned correction data value accounting for the specific pixel value DC shift;
a readout circuit configured to read an image data value out from a pixel located in a column of the pixel array;
a first summation circuit configured to add a dithered data correction value to the image data value;
a second summation circuit configured to sum a first portion of the assigned correction data value for the column where the pixel is located with a single bit dither contribution to generate the dithered data correction value; and
a selection circuit configured to select the single bit dither contribution in response to a second portion of the assigned correction data value for the column where the pixel is located.

22. The apparatus of claim 21, wherein the selection circuit comprises a multiplexing circuit having a control input configured to receive the second portion of the assigned correction data value, and output configured to generate the single bit dither contribution, and a plurality of data inputs configured to receive values of the single bit dither contribution for selection.

23. The apparatus of claim 22, wherein the selection circuit further comprises a random number generator and logic circuitry coupled to receive randomly generated bit values for application to certain ones of the plurality of data inputs of the multiplexing circuit.

24. An apparatus, comprising:
an image sensor pixel array including a plurality of pixels arranged in rows and columns, wherein pixels in each column are associated with a specific pixel value DC shift and each column of pixels having an assigned correction data value accounting for the specific pixel value DC shift;
a readout circuit configured to read an image data value out from a pixel located in a column of the pixel array;
a selection circuit configured to select a weighted dither contribution in response to a portion of the assigned correction data value for the column where the pixel is located; and
a summation circuit configured to add a data correction value to the image data value, said data correction value derived from the selected weighted dither contribution.

25. The apparatus of claim 24, further comprising:
an additional summation circuit configured to sum another portion of the assigned correction data value for the column where the pixel is located with the weighted dither contribution to generate the data correction value.

26. The apparatus of claim 24, wherein the selection circuit comprises a multiplexing circuit having a control input configured to receive the portion of the assigned correction data value, a plurality of signal inputs configured to receive weighted dither values and an output configured to supply the weighted dither contribution.

27. The apparatus of claim 26, further comprising a random number generator and logic circuitry coupled to receive randomly generated bit values and output the weighted dither values to the signal inputs of the multiplexing circuit.

* * * * *